(12) United States Patent
Butters et al.

(10) Patent No.: US 7,326,278 B2
(45) Date of Patent: Feb. 5, 2008

(54) ADVANCED CONTAMINATE TREATMENT SYSTEM

(75) Inventors: Brian E. Butters, London (CA); Anthony L. Powell, London (CA); John Douglas Pearce, London (CA); Matthew Brian Frederick Murdock, London (CA)

(73) Assignee: Purifics Environmental Technologies, Inc., London, Ontario (CA)

( * ) Notice: Subject to any disclaimer, the term of this patent is extended or adjusted under 35 U.S.C. 154(b) by 448 days.

(21) Appl. No.: 11/044,377

(22) Filed: Jan. 27, 2005

(65) Prior Publication Data
US 2005/0288512 A1 Dec. 29, 2005

Related U.S. Application Data

(60) Provisional application No. 60/598,302, filed on Aug. 3, 2004, provisional application No. 60/539,559, filed on Jan. 27, 2004.

(51) Int. Cl.
*B01D 53/04* (2006.01)

(52) U.S. Cl. .............. 95/114; 95/115; 95/116; 95/148; 95/263; 96/126; 96/130; 96/143; 96/146; 96/202; 210/188

(58) Field of Classification Search .......... 95/114, 95/115, 116, 117, 121, 126, 148, 245, 263; 96/126, 130, 143, 146, 202; 210/188
See application file for complete search history.

(56) References Cited

U.S. PATENT DOCUMENTS 5,496,395 A * 3/1996 Yamazaki .............. 96/123
5,595,586 A * 1/1997 Sivavec .............. 95/143
5,980,612 A 11/1999 Kelly

FOREIGN PATENT DOCUMENTS

| CA | 2091740 A1 | 9/1993 |
| EP | 0563669 A1 | 3/1993 |
| JP | 08150319 A2 | 6/1996 |
| JP | 11276840 A2 | 10/1999 |
| WO | WO 99/12853 A1 | 3/1999 |
| WO | WO 02/09847 A2 | 2/2002 |

OTHER PUBLICATIONS

International Search Report for corresponding PCT Application No. PCT/IB2005/000205, Applicant Purifics Environmental Technologies, Inc., inventors Butters & Powell, Jul. 18, 2005.

* cited by examiner

*Primary Examiner*—Robert A. Hopkins
(74) *Attorney, Agent, or Firm*—Baker & McKenzie LLP

(57) ABSTRACT

Decontamination systems and methods are disclosed. In one embodiment, a system comprises a first adsorption/desorption subsystem that is configured to receive a contaminated gaseous solution and remove substantially all of the contaminants from the contaminated gaseous solution during an adsorption cycle, while a second subsystem is configured to purge captured contaminants during a desorption cycle. An evacuator is configured to drive potentially flammable gas compositions from the subsystem operating in a desorption cycle back into the system such that potentially flammable gas compositions are purged from the subsystem operating in the desorption cycle at the beginning of the desorption cycle. A heat source is configured to heat contaminants adsorbed in the adsorption/desorption subsystems to remove the contaminants from the adsorption/desorption subsystems in a gaseous state during their respective desorption cycle.

25 Claims, 3 Drawing Sheets

ADVANCED CONTAMINATE TREATMENT SYSTEM

CROSS-REFERENCE TO RELATED APPLICATION

This Application claims the benefit of U.S. Provisional Application Ser. No. 60/539,559, filed on Jan. 27, 2004, and entitled "Advanced Contaminant Treatment System" and U.S. Provisional Application Ser. No. 60/598,302, filed on Aug. 3, 2004, and entitled "Phase Extraction Technology", both of which are commonly assigned with the present Application and incorporated herein by reference in their entirety for all purposes.

TECHNICAL FIELD

Disclosed embodiments herein relate generally to contamination treatment systems, and more particularly to advanced contaminant treatment systems and methods for cost-effective decontaminating of media at high flow rates.

BACKGROUND

Various industrial processes produce pollutant vapors and gases. These vapors and gases should be treated to avoid release of pollutants into the atmosphere. Other industries produce gases, which include end products, e.g., paint solvents. Recapture of end product increases the yield of a manufacturing process. Various processes have been developed to treat gas streams to serve these and other applications. Each seeks to remove contaminate gases from a standard atmospheric air (gas) stream.

Adsorption is a particularly useful technique. Adsorption removes a wide range of gas stream components. Adsorption process includes an adsorption step and a desorption step. During the adsorption step, the gas stream is brought into contact with sorbent in the form of granular activated carbon or zeolites. Gases adhere to the sorbent carbon or zeolite surfaces due to molecular attractive forces. The adsorbed gases are recovered during the desorption step. They are typically released by lowering pressure or by raising temperature. A typical method to raise temperature is by injection of steam. In conventional processes, recovered desorbed gases are often burned or converted to liquid through a refrigeration unit downstream of the desorption flow from an adsorption/desorption unit.

Photocatalytic decontamination systems (or other advanced oxidation decontamination processes) are typically cost effective in treating organic contaminants in wastewater in various applications. However, in applications in which there is a significant flow rate of wastewater to be decontaminated, or there are hydroxyl radical scavengers (e.g., alkalinity or chloride ions) in the contaminated media, the costs associated with such photocatalytic systems may become excessive or even prohibitive. While there may include multiple reasons for this increased expense, typically the principle cause of the prohibitive costs is the typical linear design of such systems and its high capital cost. What is needed are decontamination systems and methods that can decontaminate media at high-flow rates in a cost-effective manner.

BRIEF SUMMARY

In order to overcome the increased costs mentioned above, there are disclosed herein new systems and methods for decontaminating media. The disclosed system and method allows cost effective high volume decontamination, without suffering the increased capital costs often associated with high flow rate applications and may be applied where there are hydroxyl radical scavengers (e.g., alkalinity or chloride ions) in the contaminated media when other conventional systems are not effective. The novel techniques convert contaminated media into an air phase (if not already in an air phase) to carry out decontamination, and then the process flow reverts the contaminants back to an aqueous phase. Following decontamination in the air phase, the contaminated media may be passed through a separator to separate contaminants from the media, and then the media is re-circulated back to the input of the treatment system. Thus, the expense associated with the destruction of volatile organic compounds (VOCs) after such separation may be avoided, and high flow rates of wastewater may be decontaminated.

Through the disclosed approaches, several deficiencies not addressed by conventional systems may be overcome, such as avoiding explosive hazards, the fact that certain VOCs, such as Benzene, Toluene, EthylBenzene and Xylene (BTEX), are typically too dilute for cost effective use in a thermal oxidizer, the fact that 'high boilers' prevent the use of ambient pressure steam activated carbon fiber (ACF) bed desorption, and that biological-based decontamination systems typically do not function well, if at all, in cold environments. To overcome the explosive hazards, solutions include keeping the VOC components in an aqueous phase (within solubility limit) or a nitrogen environment, and avoid the build-up of oxygen in the ACF beds in the decontamination system. To address the use of BTEX as a thermal oxidizer, the disclosed techniques provide BTEX mass concentration prior to oxidation. Then, with the high boilers issue, using ACF to concentrate BTEX can only typically be accomplished if the desorption temperature exceeds the minimum boiling temperature of 140° C. Direct steam is not usually feasible due to economic constraints and hydrolysis degradation of ACF. In direct steam regeneration of ACF beds, to obtain the high boil temperature of 140° C. the large ACF container would have to be a pressure vessel, which typically has a high cost. Therefore, the ACF bed would conventionally require indirect heating to achieve the desired temperature.

The disclosed approach to the treatment requirement can also include a Phase Extraction Technology (PET) system, which may also be called Volatile Organic Product Recovery (VOPR). The system strips VOCs (such as BTEX) from influent contaminated water with an air stripper, adsorbs and concentrates the VOCs in an ACF bed, and recovers concentrated VOCs product as a vapor or liquid as desired. The ACF beds are regenerated using a hot water boiler and a heat exchanger to achieve the required thermal swing. In some embodiments, a nitrogen purge gas is employed to eliminate flammable compositions from the ACF beds before desorption, or, alternatively, the high boilers are used to purge the flammable compositions from one ACF bed (at the beginning of its desorption cycle) and transfer it into a second ACF bed (operating in its adsorption cycle).

In one aspect, a decontamination system is disclosed, and in one embodiment includes an air stripper configured to receive an aqueous solution having contaminants and to transform at least a portion of the aqueous solution and the contaminants into a contaminated gaseous solution. If the contaminated media is already in a gaseous phase (e.g., contaminated air from a paint booth, etc.), then an air stripper is not employed. In addition, in this embodiment the decontamination system includes an adsorption/desorption subsystem configured to receive the contaminated gaseous solution and to remove substantially all of the contaminants from the contaminated gaseous solution. Also included is a condenser configured to receive the remaining gaseous solution from the adsorption/desorption subsystem and to condense the remaining gaseous solution into an aqueous condensate so as to concentrate contaminants present in the remaining gaseous solution into aqueous free product. In such embodiments, also included in the system is a separator configured to receive the aqueous condensate and to separate substantially all the aqueous free product from a remainder of the aqueous condensate, wherein the air stripper is further configured to receive aqueous free product separated by the separator In another aspect, one embodiment of a decontamination system constructed as disclosed herein comprises an air stripper configured to receive an aqueous solution having contaminants and to transform at least a portion of the aqueous solution and the contaminants into a contaminated gaseous solution. Once again, if the contaminated media is already in a gaseous phase, then an air stripper is not needed in the system. In addition, this embodiment of the system includes first and second adsorption/desorption subsystems wherein one subsystem is configured to receive contaminated gaseous solution and remove substantially all of the contaminants from the contaminated gaseous solution during an adsorption cycle, while the other subsystem is configured to purge captured contaminants at the beginning of a desorption cycle. Also in such embodiments, the system includes an evacuator an evacuator configured to drive potentially flammable gas compositions from the subsystem operating in a desorption cycle back into the system such that potentially flammable gas compositions are purged from the subsystem operating in the desorption cycle at the beginning of the desorption cycle. A heat source is configured to heat contaminants adsorbed in the adsorption/desorption subsystems to remove the contaminants from the adsorption/desorption subsystems in a gaseous state during their respective desorption cycle.

BRIEF DESCRIPTION OF THE DRAWINGS

For a more complete understanding of this disclosure, and the advantages of the systems and methods herein, reference is now made to the following descriptions taken in conjunction with the accompanying drawings, in which.

DETAILED DESCRIPTION

Figure 1:
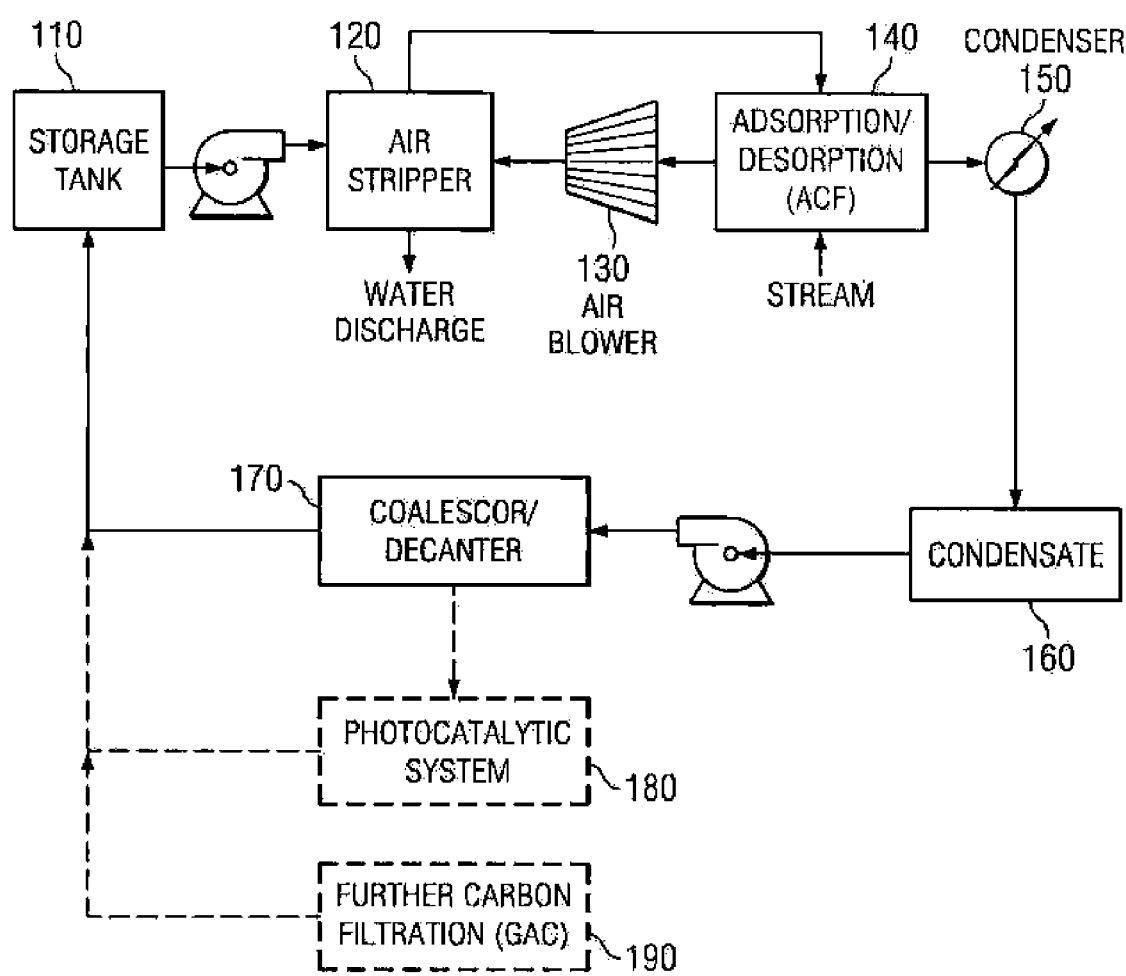
FIG. 1 illustrates one embodiment of a high flow treatment system constructed according to the principles disclosed herein.

Referring to FIG. 1, illustrated is one embodiment of a high flow treatment system 100 according to the principles disclosed herein. The system 100 includes a storage tank 110 where contaminated media may be held prior to entering the system 100 for decontamination. Examples of contaminated media may include seawater, such as that found in ballast applications for large ships, as well as fresh water reservoirs in need of decontamination. Such fresh water applications may be for decontaminating brackish water (e.g., where seawater has contaminated a fresh water supply), or for ground water suffering from high alkalinity (e.g., water residing proximate limestone deposits). Thus, the disclosed techniques are effective for treating organic contaminants in wastewater in various applications where there is a significant flow rate of wastewater to be decontaminated, and even where there are hydroxyl radical scavengers (e.g., alkalinity or chloride ions) in the contaminated media. Moreover, the disclosed techniques may also be employed to decontaminate gaseous media, as discussed below.

The first step in decontaminating the wastewater with the disclosed system 100 is to use a conventional air stripper 120 to remove the majority (or all) of the contaminants (or VOCs) from the wastewater. The air stripper 120, which may be of conventional design, places the VOCs into the air phase or state, and decontaminated water is collected in the stripper sump and continuously drained and/or used as a coolant. Once the contaminants are air-stripped by the air stripper 120, the water is discharged and the VOCs are placed into an air phase. If the contaminated media is already in a gaseous phase (e.g., contaminated air from a paint booth, etc.), then an air stripper 110 is not employed. The air containing the VOCs is transferred to another part of the system 100. To accomplish these benefits, the air containing the VOCs is transferred using an air blower 130, which may be conventional in design. The air blower 130 blows the air containing the VOCs through the air stripper 120 and through an adsorption/desorption cycles of a subsystem 140 of the process.

The adsorption/desorption cycles 140 of the decontamination process is employed to remove the majority or all of the VOCs from the air blown by the air blower 130. In an exemplary embodiment, this stage 140 may be accomplished using activated carbon fiber (ACF) to purify the contaminated air. ACF filtration is readily steam stripped and has a high surface area, which is ideal for high flow rates of water and high mass loadings of VOCs. Examples of air strippers and ACF filtration systems are discussed in greater detail in U.S. application Ser. No. 10/683,077, filed Oct. 10, 2003, entitled "System and Method for Photocatalytic Treatment of Contaminated Media," which is commonly assigned with the present disclosure and incorporated herein by reference in its entirety for all purposes.

One of the key advantages of using an ACF filtration system, as described above, is that when the ACF is regenerated with steam, it is regenerated quickly, and after the steam is condensed (see below), the majority of the organic contaminants may be recovered as free product (e.g., 98%-99% of the total organic load, depending on the solubility of the contaminants). Therefore, depending upon the type of contaminant(s) and application, the free product could be re-used. In addition, the system 100 may also be configured, as illustrated, so that the air treated in the adsorption/desorption cycle 140 is re-circulated (shown in dotted line) back to the air blower 130, thus creating a closed-loop in this portion of the system 100. Of course, although the adsorption/desorption cycle 140 is discussed in terms of ACF adsorption, the presently disclosed system 100 is not limited to any particular type of adsorption system.

After the majority or all of the VOCs have been removed during the adsorption/desorption cycle 140, any remaining contaminants (typically in steam form at this stage of the purification process) are transferred to a condenser 150. The condenser 150 is configured to condense the contaminated steam into a condensate, and concentrate the majority of the contaminants into free product, since the solubility of the VOCs are well exceeded. The steam condensate and free product mixture is transferred from the condenser 150 and stored in a condensate storage tank 160. Examples of this portion of the system 100 may also be found in the above-referenced patent application. Both the condenser 150 and condensate storage tank 160 may be conventional in design, while maintaining the benefits associated with the present decontamination system/process.

After the condensate containing the remaining VOCs has been moved to the condensate storage tank 160 (which is now in an aqueous form after being condensed), a separator may be employed to separate the remaining VOCs from the small amount of wastewater present from the condensing. In the illustrated embodiment, a separator in the form of a coalescor or decanter 170 may be used to separate the VOCs from the wastewater. An exemplary coalescor/decanter 170 may also be found in the above-referenced patent application. An advantage to employing a coalescor/decanter 170 of this type is that it is sealed. As a result, no vapor emissions are generated from the coalescor/decanter 170, and thus there is little or no explosion hazard present during use. Consequently, this type of separator would further make the decontamination system 100 sealed or enclosed (i.e., no off-gassing).

Once separated by the coalescor/decanter 170, several approaches for dealing with the resulting products may be presented. First, the VOCs may be transferred into a photocatalytic system 180 (shown in dotted line), for example, of the type disclosed in U.S. Pat. No. 5,462,674, entitled "Method and System for Photocatalytic Decontamination," issued on Oct. 31, 1995. Such a photocatalytic system 180 may be employed to destroy the remaining VOCs so that the wastewater exiting therefrom is decontaminated. The output from the photocatalytic system 180 may then be safely discharged into the environment or re-used. Another option of the decontamination system 100 would be to include further filtration 190 of the wastewater output from the coalescor/decanter 170 (also shown in dotted line in FIG. 1). If this approach is selected, further carbon filtering is employed, such as a process that employs granular activated carbon (GAC), and the output of this process may be discharged or re-used.

However, since the first and second options are typically cost-prohibitive in high flow rate applications, a third option for the system 100 is to not employ a photocatalytic system 180 or further filtering, and to simply recycle/re-circulate the coalesced wastewater back to the feed at the beginning of the treatment system 100. This would result in re-circulating (shown in solid line) the wastewater with the remaining contaminants back to, for example, the storage tank 110, thus making the entire decontamination system 100 a closed loop. By re-circulating the wastewater in this novel manner, and thus creating a closed loop system 100, a cost effective option for high flow wastewater applications is created. Of course, the disclosed system 100 is broad enough to encompass any further type of filtration during the re-circulation of the wastewater or no further filtration at all.

With the embodiment of FIG. 1, a novel decontamination system and process is provided for decontamination of VOCs in aqueous media by beginning with a contaminated aqueous media, transferring the aqueous media to an air phase, and then transferring the media from an air phase back to an aqueous phase for re-circulation back to the beginning of the system/process. In addition, the disclosed system/process incorporating the re-circulation of wastewater is an ambient temperature process, and thus no greenhouse gasses are generated during the decontamination process. Also, with this novel approach, there is no destruction of any chemicals. Instead, all contaminants are eventually collected as free product for re-use or disposal. Moreover, such disposal would be low cost due to low volume and high BTU value present.

Furthermore, the inlet air stream or feed water to the air stripper 120 may be employed to cool the steam in the condenser 150, which would eliminate the need for external cooling water to form the condensate. Additionally, by creating a system having the closed feedback loops for the air output from the adsorption/desorption cycle 140 of the process and from the coalescor/decanter 170, as discussed above, the system may be designed such that there is only contaminated water coming in, treated water out and free product out. Thus, the only external inputs to the system/process would be steam (at the adsorption/desorption cycle 140) and electric power to power the various pumps and components of the system. Therefore, in general, the system/process would be a chemical-free operation, would have instant ON/instant OFF operation, and eliminates the need for air permitting.

Figure 2:
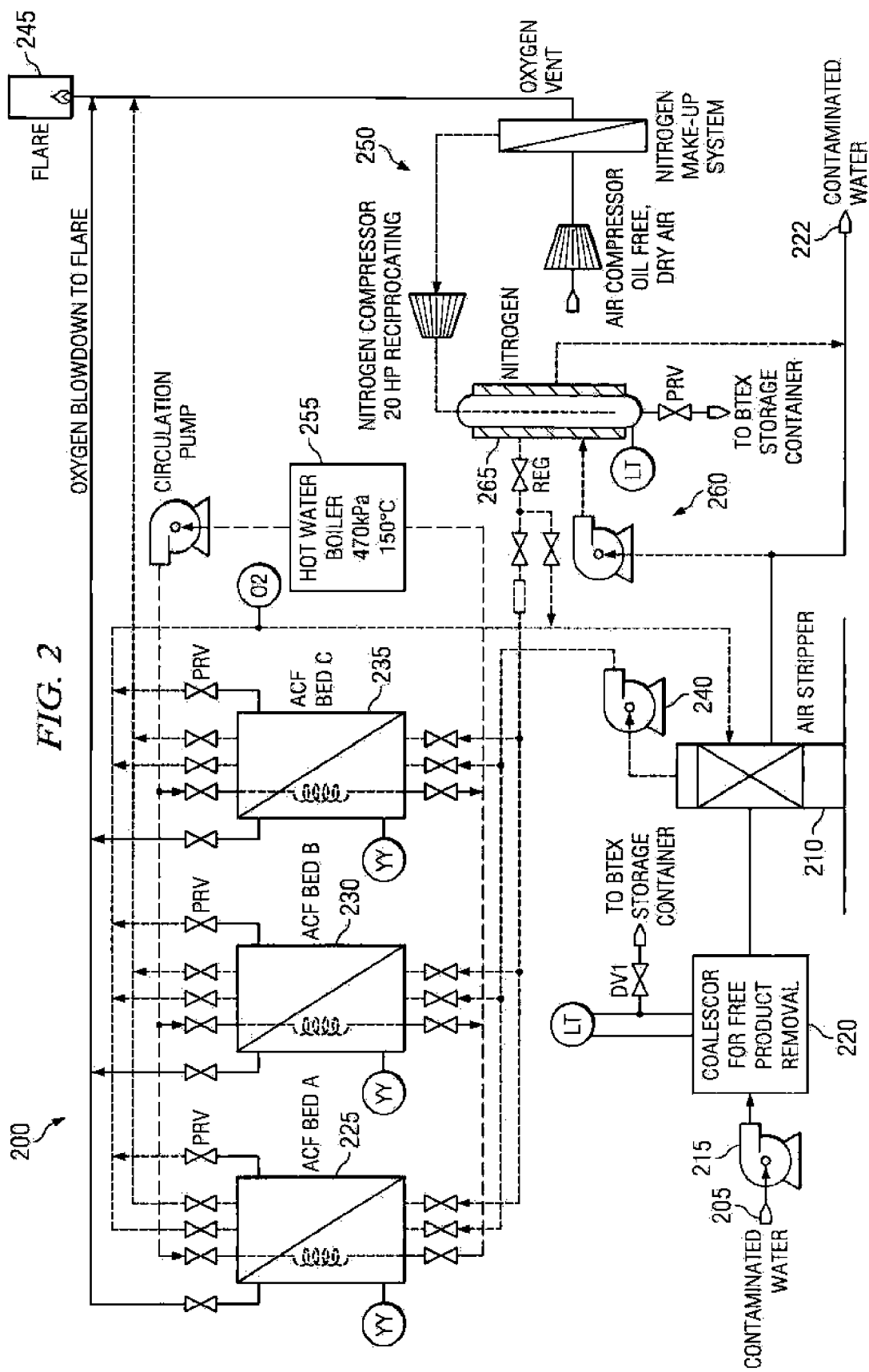
FIG. 2 illustrates an embodiment of a contaminant treatment system constructed according to the disclosed principles for water-free decontamination.

Turning now to FIG. 2, illustrated is another embodiment of a contaminant treatment system 200 constructed according to the disclosed principles. Specifically, this embodiment differs from the embodiment illustrated in FIG. 1 in that it eliminates the use of the back-end coalescor 170 and the optional photocatalytic system 180 since the VOCs are recovered in a water-free form (i.e., no need to separate free product from water if there is no water present at the time of product recovery).

The embodiment in FIG. 2 is still employed to decontaminate contaminated wastewater 205 (or other contaminated media) with an air stripper 210. The contaminated media is pumped via a fluid pump 215 into a front-end oil inline separation (OILS) coalescor 220 to remove slugs of free product at the front end of the decontamination process and relieve downstream equipment. As an example, such a technique may be used for decontaminating the ballast water used by large ships, such as oil tankers. Such an application demands a very high flow rate for the decontamination system, since many ports of call charge based on the length of stay of the ship. In such an example, the pump 215 provides 11400 lpm [3000 gpm] @ 120 kPa [20 psia]. From here, the remaining contaminated media is fed into the air stripper 210, which may be a packed-bed stripper tower with dimensions of about 3.65 m [12'] diameter×12.19 m [40'] high, and a 2.2 kPa [9" $H_2O$] pressure drop across packing. The air stripper 210 may also have an optional heat-traced shell for freeze protection when operating in cold environments. As before, a large portion of the contaminants (VOCs) from the contaminated media are stripped by the air stripper 210 by placing the VOCs into an air phase/state. Wastewater that has successfully been decontaminated is discharged from the air stripper 210 via a system exit 222. In addition, water-free VOC liquid product may be discharged automatically from the coalescor 220 under line pressure to a collection point (not illustrated). Again, if the contaminated media is already in a gaseous phase (e.g., contaminated air), then the coalescor 220 and air stripper 210 are not necessary.

The air containing the VOCs is transferred to a group of ACF beds 225, 230, 235 using a blower 240. The ACF beds 225, 230, 235 provide the adsorption/desorption cycles discussed with respect to FIG. 1 above, where during the adsorption cycle, the remaining VOCs are removed from the passing air, and during the desorption cycle, the filter modules are 'regenerated' so that they can again be used during an adsorption cycle in the decontamination process. Also in this embodiment, once the VOCs have been removed from the contaminated air by the ACF beds 225, 230, 235 during an adsorption cycle, the remaining decontaminated air or gas may then be discharged out of the system 200 or recycled back into the system (e.g., ventilation system air or perhaps back to the air stripper 210 if one is present). In an exemplary embodiment, the ACF beds 225, 230, 235 provide about 1,600 kg of ACF total (533 kg per bed), and operate at 15,000 cfm each.

In the illustrated embodiment, two ACF beds are actively adsorbing contaminants at all times while the third ACF bed is desorbing/cooling during this time. Exemplary sizes may be 2.32 m diameter×3 m high (12.7 m³) for each bed, with stripper ducting about 0.75 m (30") diameter or 0.69 m square. As with the air stripper 210, the ACF beds 225, 230, 235 may optionally include a heat-traced shell for freeze protection. The ACF media in the beds 225, 230, 235 is optimized to be as thick as possible to generate the sharpest breakthrough curve and most efficient adsorption. As a result, the VOCs are trapped in the media with any nitrogen present returned to the air stripper 210. In advantageous embodiments, adsorption will last for about three hours.

The system 200 in FIG. 2 also now includes an evacuator or evacuator subsystem in the form of a nitrogen loop 250 for use at the beginning of a desorption cycle of the ACF beds 225, 230, 235. More specifically, at the beginning of the desorption cycle, the contaminants held in the ACF beds 225, 230, 235 (which accumulate during the adsorption cycles of the decontamination process) are removed or purged so that the ACF beds 225, 230, 235 are ready for use during another adsorption cycle. This is the "regeneration" of the ACF beds 225, 230, 235. As mentioned above, the regeneration of the ACF beds 225, 230, 235 in the system 100 of FIG. 1 is accomplished using a steam-based process. In contrast, in the system 200 of FIG. 2 the regeneration is not done using steam, which is a 'wet heat', but rather with a 'dry heat' via resistive heating, pressurized hot water coils 255, or any other type of generator of dry heat.

Desorbing with a dry heat allows desorbing at temperatures greater than 100° C., which permits operation of VOCs with boiling points>100° C. (i.e., "high boilers") without a pressure vessel (which typically impart huge costs to the systems, as well as oversized equipment). The system 200 is thermally integrated to recover energy from ACF bed heat and cool cycles, compressed gas cooling, and the hot water boiler 255 (on-demand heat is provided by a circulation pump and hot water at 150° C. @470 kPa). Where desired, cold treated media (e.g., contaminated seawater in this example) may be used as a liquid coolant. Relative humidity is maintained below 100% RH by using an induced-draft blower on the air stripper 210, as opposed to a forced-draft blower as found in conventional designs. In addition, timing in the heat exchanger (provided by the loop of the boiler 255 to the ACF beds 225, 230, 235) will correspond with the ACF adsorption/desorption cycles. Turndown control in the exchangers will allow energy to be directed where needed.

In the illustrated system 200, nitrogen circulation consists of two loops: the air stripper 210 nitrogen loop and the desorption nitrogen loop 250. Nitrogen volume is exchanged between the two loops each time an ACF bed 225, 230, 235 switches from an adsorption to a desorption cycle and via the nitrogen make-up line. More specifically, the air stripper 210 uses a closed nitrogen loop. Periodic oxygen blow-downs are made up from the nitrogen reservoir tank 265 directly into the air stripper 210. Nitrogen flow from the reservoir 265 is controlled to provide the proper ACF bed purge rate. It is first exchanged with returning hot vapor prior to final heating to 140° C. by the hot water boiler 255. The desorbed nitrogen/VOC vapor is heat-exchanged and further reduced to ambient conditions in a liquid/gas exchanger before being recompressed to nominally 650 kPa [95 psia]. The liquid VOC collects in the nitrogen reservoir 265 for periodic removal.

The use of a dry heat also eliminates hydrolysis reactions in the ACF beds 225, 230, 235, which can degrade the elements in the beds and create undesirable by-products. Furthermore, dry heat also allows for complete product recovery (i.e., no product lost in water phase). In such embodiments, the off-gas recovery system found in FIG. 1 is replaced with a compressor system 260 to compress the VOC gas into a liquid for recovery. More specifically, such a compressor separates the VOCs from nitrogen provided by the nitrogen loop 250, and provides the transport mechanism for the VOCs to exit the ACF beds 225, 230, 235. The resulting liquid VOCs may then be collected in a tank 265 and then pumped out of the system 200. In addition, oxygen stripped from the water is removed as needed by blowdown in the ACF beds 225, 230, 235 after desorption and cooling of the bed, and prior to breakthrough. Make-up nitrogen is provided by a nitrogen reservoir 265 into the air stripper to ACF bed loop.

As is well known, an accumulation of flammable molecules and/or compositions in the ACF beds 225, 230, 235 during the decontamination process creates a risk of explosion within the decontamination system. The nitrogen loop 250 introduced above is provided in this embodiment to reduce or eliminate the potential for explosions by eliminating the presence of flammable gas compositions in the ACF beds 225, 230, 235. In most embodiments, oxygen may be present in the ACF beds 225, 230, 235, so the disclosed nitrogen loop 250 serves to force out the flammable oxygen compositions from the filter beds by replacing it with non-flammable nitrogen. As a result, rather than feeding gases from the ACF beds back to the air stripper 210 as was an option in the system 100 of FIG. 1, the nitrogen loop 250 in the system 200 of FIG. 2 serves to prevent the continued presence of oxygen (or other potentially flammable gas compositions) in the ACF beds, thus reducing the potential for explosions in the system 200. As the oxygen is forced out of the ACF beds 225, 230, 235, it may then be disposed of as appropriate, while nitrogen is looped back into the nitrogen reservoir 265 for use in the same manner at another time.

In exemplary embodiments, the nitrogen pressure will fluctuate with heating and cooling operations, variability in the stripper sump water column, and fluctuations in water, blowdown, and make-up flow. Over and under pressure in the nitrogen loop 250 is managed by high-reliability and fail-safe vacuum breakers, pressure relief valves, and mass flow regulation primarily located at the ACF beds 225, 230, 235 and nitrogen reservoir 265 controlled to maintain atmospheric pressure. The air stripper 210 sump level may be used as a mechanical pressure control system—overpressure is relieved by overflow and underpressure is relieved by mechanically opening a nitrogen make-up valve. Moreover, the maximum acceptable oxygen concentration in a nitrogen loop in such embodiments should be identified. All ignition sources are eliminated by the use of special blowers and materials, proper grounding, intrinsically safe sensors and controls, and the like.

Ideal desorption in such embodiments is plug flow with a single bed-volume of VOC-rich purge gas. While this may be an optimal case, the practical case minimizes the purge gas while ensuring maximum desorption. In an exemplary embodiment, the basic desorption sequence for the system 200 in FIG. 2 is as follows (the first bed 225 leads the third bed 235 in adsorption runtime, while the second bed 230 is taken offline for desorption):

1. The second ACF bed 230 is isolated from the air stripper 210 by closing influent and effluent valves.
2. The nitrogen purge effluent valve is opened only.
3. The ACF bed 230 is heated by pressurized hot water coils and the vapour expands.
4. The nitrogen compressor begins to pull heated nitrogen and desorbed vapor out of the ACF bed 230 to equalize and maintain the bed pressure at one atmosphere.
5. When the last boiling point is reached (140° C.) the nitrogen desorption inlet valve is opened and the compressor ramps up to circulate three bed volumes of nitrogen (12.3 M³/min). Total heat-up time will be 30 minutes.
6. The second ACF bed 230 is isolated by closing all valves; VOC removal is complete. Hot water heating is stopped.
7. The second ACF bed 230 is cooled by slowly opening influent valve allowing air stripper gas to cool the thermal mass at a controlled rate. The effluent valve is fully opened to the stripper nitrogen loop.
8. When fully cooled to the operating temperature (nominally 60° C.) the bed 230 is brought online for adsorption and the first ACF bed 225 is taken offline for desorption, where the above process is repeated for that bed 225.

In such embodiments, the complete desorption/cooling cycle will last nominally one hour. For the first two hours of adsorption runtime the ACF beds 225, 230, 235 will be used to blowdown oxygen as needed.

Thus, the system 200 provided in FIG. 2 improves upon known techniques by providing for virtually the complete product recovery of VOCs or other contaminants, such as BTEX, and other solvents used in decontamination systems.

In such embodiments, this phase extraction technology strips VOCs from influent waste water with nitrogen, adsorbs and concentrates the VOCs in an ACF bed, and recovers concentrated VOC product as a liquid. Table 1 sets forth some exemplary treatment requirements for the phase extraction technology illustrated in system 200 for the ballast water example discussed in detail above.

TABLE 1

| Influent | Full Scale |
|---|---|
| Aqueous Flow | 11356 lpm [3000 gpm] |
| Est. Stripper Flow | 850 m3/min [30000 cfm] |
| BTEX Concentration | 0.114 kg/min [10 ppm] |

| Contaminant of Concern | Boiling Pt [° C.] @ 1 atm | Flash Pt [° C.] @ STP | Solubility [g/100 ml] @ STP |
|---|---|---|---|
| Benzene | 80.1 | −11 | 0.18 |
| Toluene | 110.6 | 4 | 0.0526 |
| EthylBenzene | 136.2 | 15 | 0.0206 |
| Xylenes | 140 | 25 | 0.0175 |

Benefits over conventional techniques and systems include the system being a closed-loop air stream from contamination to reuse, no sources of air/gas emission, no explosion hazards, a high service life for the system components, minimal service or consumables, operation in an Arctic environment, negating the need for an air permit from the Environmental Protection Agency, and exemplary operating and maintenance costs in the range of $250 per 1 million gallons of contaminated water. Table 2 illustrates some exemplary ACF desorption scenarios possible with the disclosed approach. Of course, each application may require its own unique adjustments in order to obtain best results.

TABLE 2

| Scenario | Description | Pro | Con |
|---|---|---|---|
| 1. Conventional Steam | Direct-contact steam provides latent heat & convection | Commercially Proven Simple housing design (few internals) | ACF wet -> increases desorption duty Hydrolysis potential Boiler size may be insufficient purge. |
| 2. Hot Water-Core + N2 Loop | Non-contact hot water coil provides latent heat. Nitrogen used as dry convection purge. | ACF remains dry No water treatment required? Closed steam loop | Complex housing |
| 3. Steam-Core + Steam Loop | Non-contact steam coil provides latent heat. Direct steam used as convection purge. | Close to commercially proven designs | ACF Wet Hydrolysis potential Complex housing Boiler size may be insufficient |
| 4. Electric Core + N2 Loop | Non-contact electric heater provides latent heat. Nitrogen provides convection purge. | ACF remains dry Instant On Can use ACF as heater core. Maximum efficiency | Some Patents Not commercially proven |
| 5. Thermal Core + Flare | Non-contact hot water coil provides latent heat. Desorption by nitrogen directly to a flare. | Simplified nitrogen desorption loop | Regulated air emission |

Figure 3:
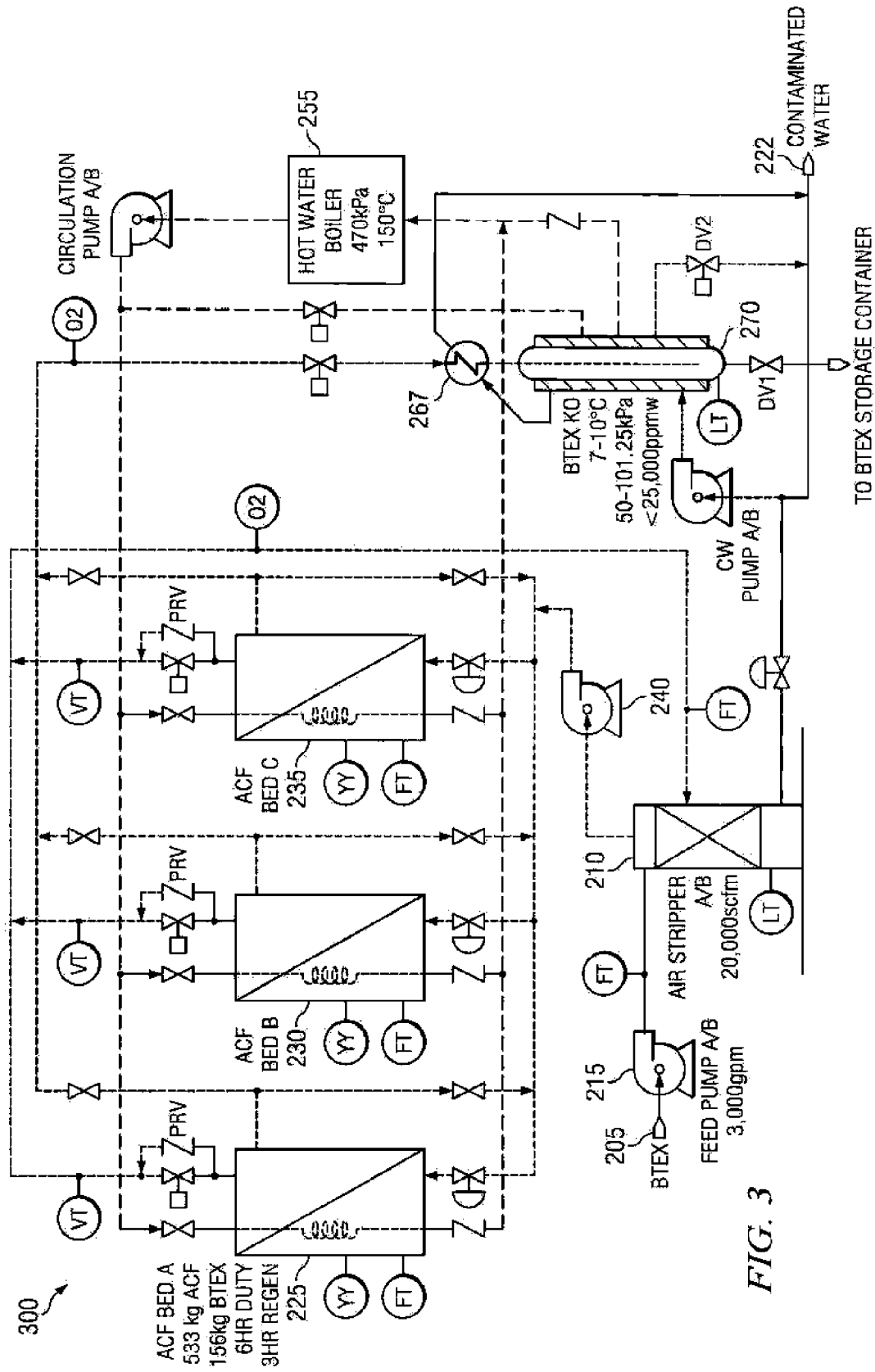
FIG. 3 illustrates another embodiment of a contaminant treatment system according to the disclosed principles having a nitrogen-free desorption cycle.

Looking now at FIG. 3, illustrated is another embodiment of a decontamination system 300 constructed according to the principles disclosed herein. This embodiment differs from the embodiment illustrated in FIG. 2 in that it eliminates the use of a nitrogen loop to help purge the ACF beds 225, 230, 235 of flammable molecules, such as oxygen. More specifically, the system 300 in FIG. 3 is again employed in this embodiment to decontaminate contaminated seawater 205 (or other contaminated media) using an air stripper 210. The contaminated media is pumped via the pump 215 directly into the air stripper 210 where, as before, some contaminants (VOCs) in the media are stripped by the air stripper 210 by placing the VOCs (and a portion of the media) into an air phase/state. Wastewater that has successfully been decontaminated within the air stripper 210 is discharged from the air stripper 210 via a system exit 222.

As before, an air stripper 210 is not needed in the process if the contaminated media is already in a gaseous phase, such as contaminated air. Then, also as before, the air phase containing the VOCs is transferred to the group of ACF beds 225, 230, 235 using a blower 240. The ACF beds 225, 230, 235 provide the adsorption/desorption cycles discussed above, where during the adsorption cycle, the remaining VOCs are removed from the passing air, and during the desorption cycle, the ACF beds 225, 230, 235 are regenerated so that they can again be used during an adsorption cycle during the decontamination process. Once the VOCs have been removed from the contaminated air by the ACF beds 225, 230, 235, the remaining decontaminated air or gas may then be discharged out of the system 200 or recycled as discussed above.

Although functioning primarily the same as the system 200 in FIG. 2 during the adsorption cycle of the decontamination process, the system 300 in FIG. 3 provides a different approach to the desorption cycle of the ACF beds 225, 230, 235. Specifically, the system 300 in FIG. 2 eliminates the use of a nitrogen loop (e.g., loop 250 in FIG. 2). As mentioned above, the nitrogen loop may be implemented to remove the oxygen (or other potentially flammable molecules and/or compositions) from the ACF beds 225, 230, 235 during each module's desorption cycle. With a nitrogen loop, while successful in removing the oxygen from the ACF beds 225, 230, 235, the loop itself would typically have to be bled to evacuate the accumulated oxygen. In addition, the nitrogen in the loop is regularly replenished to ensure its operation. Moreover, oxygen sensors are typically employed in a nitrogen loop application, which would no longer be required with the embodiment of FIG. 3.

The specific function of the system 300 in FIG. 3 to purge the oxygen or other potentially flammable gas compositions from the ACF beds 225, 230, 235 is relatively simple. At some point in the operation of the system 300, the first ACF bed 225 is operating in the adsorption cycle, and is therefore removing VOCs, such as BTEX, from the gaseous media flowing through it. After a predetermined time of operating in an adsorption cycle, the VOCs in the first ACF bed 225 accumulate beyond a given threshold, which means that the ACF bed 225 should be switched to a desorption cycle to remove the accumulated contaminants and regenerate the ACF bed 225. Thus, in this embodiment, the first ACF bed 225 is heated using a heat source, which in the illustrated embodiment is a hot water boiler 255.

The boiler 255 is used to generate high heat energy and to deliver that heat to the individual ACF beds 225, 230, 235 when they are in their respective desorption cycle (each ACF bed 225, 230, 235 may be closed off as needed using conventional valves). For example, in the first ACF bed 225, there is a certain volume of air at the beginning of the desorption cycle, and that volume of air should be removed from the ACF bed 225 if possible to reduce the chance for an explosion (usually because of the oxygen or oxygen-based compositions present). Therefore, in the embodiment of the system 300 in FIG. 3, the contents of the first ACF bed 225 are heated using the boiler 255 so the pressure inside the bed 225 starts to increase and drives that air out. More specifically, a combination of vapor pressure and the boiling of the contaminants in the bed 225 (which further increase pressure when those contaminants are changed from liquid to vapor from the heating) creates an overall pressure in the bed 225 that forces the potentially flammable gas compositions out of the bed 225. Then, rather than just sending these gas compositions into the atmosphere, the gas is sent from the initial bed 225 to the adjacent second ACF bed 230, which is currently operating in its adsorption cycle (i.e., decontaminating incoming contaminated air sent from the air stripper 210). The adsorption stage of the second ACF bed 230 can then remove any small amounts of VOCs (e.g., BTEX) in that transferred gas volume.

Such a transfer of one bed volume from one of the ACF beds to the other bed need only be done once, at the beginning of the desorption cycle for each bed. As a result, the potential for explosions is reduced or eliminated (by removing oxygen or other potentially flammable compositions) present at the beginning of the desorption cycle), and decontaminating that bed volume with an adjacent active ACF bed. It should be noted that although three ACF beds 225, 230, 235 are illustrated in FIG. 3, this disclosed technique may be accomplished using only two ACF beds if desired. Moreover, this approach never allows the VOC mixture in the ACF bed in its desorption cycle (e.g., bed 225 in this example) to be above the lower explosive limit (LEL) or below the upper explosive limit (UPL) during its desorption cycle by removing any potential flammables that may create a combustible situation.

By implementing the type of closed loop technique illustrated in FIG. 3 into a decontamination system as disclosed herein, several advantages may be achieved. For example, by purging the oxygen (or other flammable composition) from the ACF beds during desorption, a concentrated gas streamer of substantially pure VOC remains. As a result, in such embodiments there is no need to implement a separation device or technique (such as the condenser and coalescor combination in the system 100 of FIG. 1) because there is nothing left except for the VOC to be removed. Another advantage in such embodiments is that the contaminants may be recovered in pure vapor form, which allows the system 300 to able to work with VOCs above the 100° C. temperature. Typically, decontamination systems operating in such high temperature ranges required very large and expensive heating systems to generate the necessary heat. Instead, this approach allows the use of high boilers (such as the hot water boiler 255 in FIG. 3), which are far more cost efficient to own and operate.

Still further, since a dry heat is used to remove the contaminants (as opposed to a steam, which requires a separation of the water from the contaminants at some point in the process), the substantially pure (e.g., 99.9% VOC) may be flared to disposed of it, it may also be burned and the generated heat recovered for energy, it may be stored as a gas, or it could be compressed (e.g., 267 would be a compressor, as in FIG. 2) or condensed (267 would be a condenser, as in FIG. 3) back into a liquid phase and fully recovered and stored in a tank 270. In fact, recovering the VOCs and burning them to generate the energy needed by the boiler(s) 255 reduces one of the more substantial operating casts associated with operating the system 300. In addition, the use of a dry heat eliminates the potential of a hydrolysis reaction with the elements in the ACE beds 225, 230, 235, so the ACF beds are not damaged by water molecules found in the steam used in a wet beat. Furthermore, there is also a competitive advantage in such embodiments in that the type of closed loop created by forcing the air from one ACE bed to another results in no discharge from the overall system 300. As a result, no EPA discharge permit (for discharging items into the atmosphere) is required.

While various embodiments of advanced decontamination systems and methods according to the principles disclosed herein, have been described above, it should be understood that they have been presented by way of example only, and not limitation. Thus, the breadth and scope of the invention(s) should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A decontamination system, comprising:
    an adsorption/desorption subsystem configured to receive contaminated gaseous solution and to remove substantially all of the contaminants from the contaminated gaseous solution during an adsorption cycle, the adsorption/desorption subsystem compriing first and second adsorption/desorption modules operable in alternating adsorption and desorption cycles, wherein one module is configured to receive contaminated gaseous solution and remove substantially all of the contaminants from the contaminated gaseous solution during its adsorption cycle while the other module is configured to purge captured contaminants during its desorption cycle;
    a dry-heat heat source configured to heat contaminants adsorbed in the adsorption/desorption subsystem to remove the contaminants therefrom during a desorption cycle by heating the contaminants to a gaseous state to create a vapor pressure in the adsorption/desorption subsystem sufficient to drive out the gaseous contaminants as a substantially pure volume;
    a condenser configured to receive the substantially pure volume of gaseous contaminants driven out of the adsorption/desorption subsystem by the vapor pressure and to condense the substantially pure volume of gaseous contaminants into a substantially pure condensate of the contaminants for recovery as a liquid free product; and
    an evacuator configured to drive potentially flammable gas compositions from the module operating in a desorption cycle back into the system such that potentially flammable gas compositions are purged from the module operating in the desorption cycle at the beginning of the desorption cycle.

2. A decontamination system according to claim 1, wherein the dry-heat heat source comprises a hot-water boiler, the hot-water boiler configured to heat water and pass the heated water through the adsorption/desorption subsystems to heat the contaminants to a gaseous state to remove the gaseous contaminants during the desorption cycle.

3. A decontamination system according to claim 2, wherein the hot-water boiler is further configured to pressurize water to create the heated water having a temperature above 100° C.

4. A decontamination system according to claim 1, wherein the dry-heat heat source further comprises a coil within the adsorption/desorption subsystem for providing the dry-heat proximate to the contaminants.

5. A decontamination system according to claim 1, further comprising a separator configured to receive the condensate and to separate substantially all of the liquid free product from and remaining aqueous condensate.

6. A decontamination system according to claim 5, wherein the separator is further configured to send the separated remainder of aqueous condensate back to an air stripper coupled in front of the adsorption/desorption subsystem.

7. A decontamination system according to claim 5, further comprising a photocatalytic system coupled to the separator and configured to eliminate the separated remainder of aqueous condensate.

8. A decontamination system according to claim 5, further comprising a secondary filtration subsystem coupled to the separator and configured to eliminate the separated remainder of aqueous condensate.

9. A decontamination system according to claim 1, further comprising an air stripper configured to receive an aqueous solution having contaminants and to transform at least a portion of the aqueous solution and the contaminants into the contaminated gaseous solution.

10. A decontamination system according to claim 9, further comprising an air blower coupled between the air stripper and the adsorption/desorption subsystem, and configured to transfer at least a portion of the remaining gaseous solution from the adsorption/desorption subsystem to the air stripper.

11. A decontamination system according to claim 1, wherein the evacuator comprises a nonflammable gas loop configured to deliver nonflammable gas into the subsystem operating in a desorption cycle to purge the flammable gas compositions from that subsystem at the beginning of its desorption cycle and back into the system.

12. A decontamination system according to claim 11, wherein the nonflammable gas comprises nitrogen.

13. A decontamination system according to claim 1, further comprising a burning device for burning the gaseous contaminants removed from the adsorption/desorption subsystem.

14. A method of decontaminating media, the method comprising:

receiving a contaminated gaseous solution;

removing substantially all of the contaminants from the contaminated gaseous solution using first and second adsorption/desorption subsystems;

heating contaminants adsorbed in the first and second adsorption/desorption subsystems during their respective desorption cycle, while the other of the subsystems is in its adsorption cycle, with a dry-heat to transform the adsorbed contaminants from the subsystem operating in the desorption cycle to a gaseous state to create a vapor pressure in the adsorption/desorption subsystem sufficient to drive out the gaseous contaminants as a substantially pure volume;

condensing the substantially pure volume of gaseous contaminants driven out of the adsorption/desorption subsystem by the vapor pressure into a substantially pure condensate for recovery as a liquid free product; and evacuating potentially flammable gas compositions from the subsystem operating in a desorption cycle such that potentially flammable gas compositions are purged from the subsystem operating in the desorption cycle at the beginning of the desorption cycle.

15. A method according to claim 14, wherein heating with a dry-heat comprises passing heated water through the adsorption/desorption subsystem to heat the contaminants to a gaseous state during the desorption cycle.

16. A method according to claim 15, wherein the heating further comprises pressurizing water to create the heated water passed through the adsorption/desorption subsystem having a temperature above 100° C.

17. A method according to claim 14, further comprising separating substantially all of the liquid free product from any remaining aqueous condensate.

18. A method according to claim 17, further comprising recirculating the separated remainder of aqueous condensate back to an air stripper coupled in front of the adsorption/desorption subsystem before the removing step.

19. A method according to claim 14, further comprising eliminating the separated remainder of aqueous condensate using photocatalytic treatment.

20. A method according to claim 15, wherein passing heated water further comprises passing heated water through a coil within the adsorption/desorption subsystem for providing the dry-heat proximate to the contaminants.

21. A method according to claim 14, further comprising:

providing an aqueous solution having contaminants; and transforming the aqueous solution and the contaminants to the contaminated gaseous solution before the removing step.

22. A method according to claim 21, further comprising blowing at least a portion of the contaminated gaseous solution back for the removing step.

23. A method according to claim 14, wherein the evacuating comprises delivering a nonflammable gas into the subsystem operating in a desorption cycle to purge the substantially contaminant-free vapors from that subsystem at the beginning of its desorption cycle.

24. A method according to claim 23, wherein the nonflammable gas comprises nitrogen.

25. A method according to claim 14, further comprising burning the gaseous contaminants removed from the adsorption/desorption subsystems.

* * * * *